(12) United States Patent
Su et al.

(10) Patent No.: US 11,782,532 B2
(45) Date of Patent: Oct. 10, 2023

(54) CALIBRATION METHOD AND CALIBRATION APPARATUS FOR KNOB APPLICABLE TO TOUCH PANEL

(71) Applicant: HIMAX TECHNOLOGIES LIMITED, Tainan (TW)

(72) Inventors: Chun-Jen Su, Tainan (TW); Cheng-Hung Tsai, Tainan (TW); Po-Hsuan Huang, Tainan (TW); Chun-Kai Chuang, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 17/531,785

(22) Filed: Nov. 21, 2021

(65) Prior Publication Data
US 2022/0365608 A1 Nov. 17, 2022

Related U.S. Application Data

(60) Provisional application No. 63/186,805, filed on May 11, 2021.

(51) Int. Cl.
*G06F 3/0362* (2013.01)
*G06F 3/041* (2006.01)

(52) U.S. Cl.
CPC .......... *G06F 3/0362* (2013.01); *G06F 3/0418* (2013.01)

(58) Field of Classification Search
CPC .............................. G06F 3/0362; G06F 3/0418
See application file for complete search history.

(56) References Cited

U.S. PATENT DOCUMENTS

| 2008/0192025 | A1 | 8/2008 | Jaeger | |
| 2008/0238879 | A1 | 10/2008 | Jaeger | |
| 2020/0004348 | A1 | 1/2020 | Knoppert | |
| 2020/0073487 | A1* | 3/2020 | Ballan | G06F 3/0362 |
| 2020/0233521 | A1* | 7/2020 | Sasaki | G06F 3/0393 |
| 2021/0048846 | A1* | 2/2021 | Hinson | G05G 1/02 |
| 2021/0240307 | A1* | 8/2021 | Tanaka | G06F 3/0446 |

FOREIGN PATENT DOCUMENTS

| JP | 6391893 B1 | 9/2018 |
| JP | 2020-87174 A | 6/2020 |
| WO | 2016/166793 A1 | 10/2016 |
| WO | 2019/116490 A1 | 6/2019 |

* cited by examiner

*Primary Examiner* — Chun-Nan Lin
(74) *Attorney, Agent, or Firm* — Winston Hsu

(57) ABSTRACT

A calibration method and a calibration apparatus for a knob applicable to a touch panel are provided. The knob includes at least one sensing pad. The calibration method includes: obtaining sensed position(s) of each sensing pad by sensing a position of the sensing pad through the touch panel; and calculating a position of a center of the knob by using a formula of a radius of a circumscribed circle according the sensed position(s) of each sensing pad.

10 Claims, 5 Drawing Sheets

CALIBRATION METHOD AND CALIBRATION APPARATUS FOR KNOB APPLICABLE TO TOUCH PANEL

CROSS REFERENCE TO RELATED APPLICATIONS

This application claims priority to U.S. Provisional Patent Application No. 63/186,805, filed on May 11, 2021, the disclosure of which is incorporated herein by reference in its entirety.

BACKGROUND OF THE INVENTION

1. Field of the Invention

The present invention relates to a user interface (UI) mechanism design, and more particularly, to a calibration method for a knob applicable to a touch panel.

2. Description of the Prior Art

Knob devices are often used in general electronic apparatus, such as the knob for volume adjustment on an audio player, the knob for frequency adjustment on a radio and the knob for air conditioning/air volume adjustment on a car console, where many of these electronic apparatuses are equipped with a touch panel. Therefore, how to integrate the knob device and the touch panel to assist user in control has become an issue. When a touch panel is equipped with a knob, a position of the knob may be offset for some reasons. For example, the position of the knob may be offset for positioning error or deterioration of the laminated material due to the aging. The offset of the position will cause the wrong determination of the rotation angle of the knob, and further affect the stability and reliability of the knob. Thus, a novel calibration method and associated architecture are needed without introducing any side effect or in a way that is less likely to introduce a side effect.

SUMMARY OF THE INVENTION

It is therefore an objective of the present invention to provide a calibration method for obtaining a new center of a knob and an associated calibration apparatus.

At least one embodiment of the present invention provides a calibration method for a knob applicable to a touch panel. The knob comprises at least one sensing pad. The calibration method comprising: obtaining at least one sensed position of each sensing pad of said at least one sensing pad by sensing a position of said each sensing pad through the touch panel; and calculating a position of a center of the knob by using a formula of a radius of a circumscribed circle according said at least one sensed position of said each sensing pad.

At least one embodiment of the present invention provides a calibration apparatus for a knob applicable to a touch panel. The knob comprises at least one sensing pad. The calibration apparatus comprises a sensing processing circuit and a calculation circuit. The sensing processing circuit is configured to obtain at least one sensed position of each sensing pad of said at least one sensing pad by sensing a position of said each sensing pad through the touch panel. The calculation circuit is configured to calculate a position of a center of the knob by using a formula of a radius of a circumscribed circle according said at least one sensed position of said each sensing pad.

The present invention calibration method and calibration apparatus are able to obtain the new center of the knob by calculating. Through pressing or rotating the knob, the position of one or more sensing pads can be obtained. The new center of the knob can be calculated according enough sensed positions of one or more sensing pads. The calibration method of the present invention provides an accurate position of the center of the knob, thereby preventing the rotation angle of the knob from being determined erroneously and improving the stability and reliability of the knob.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
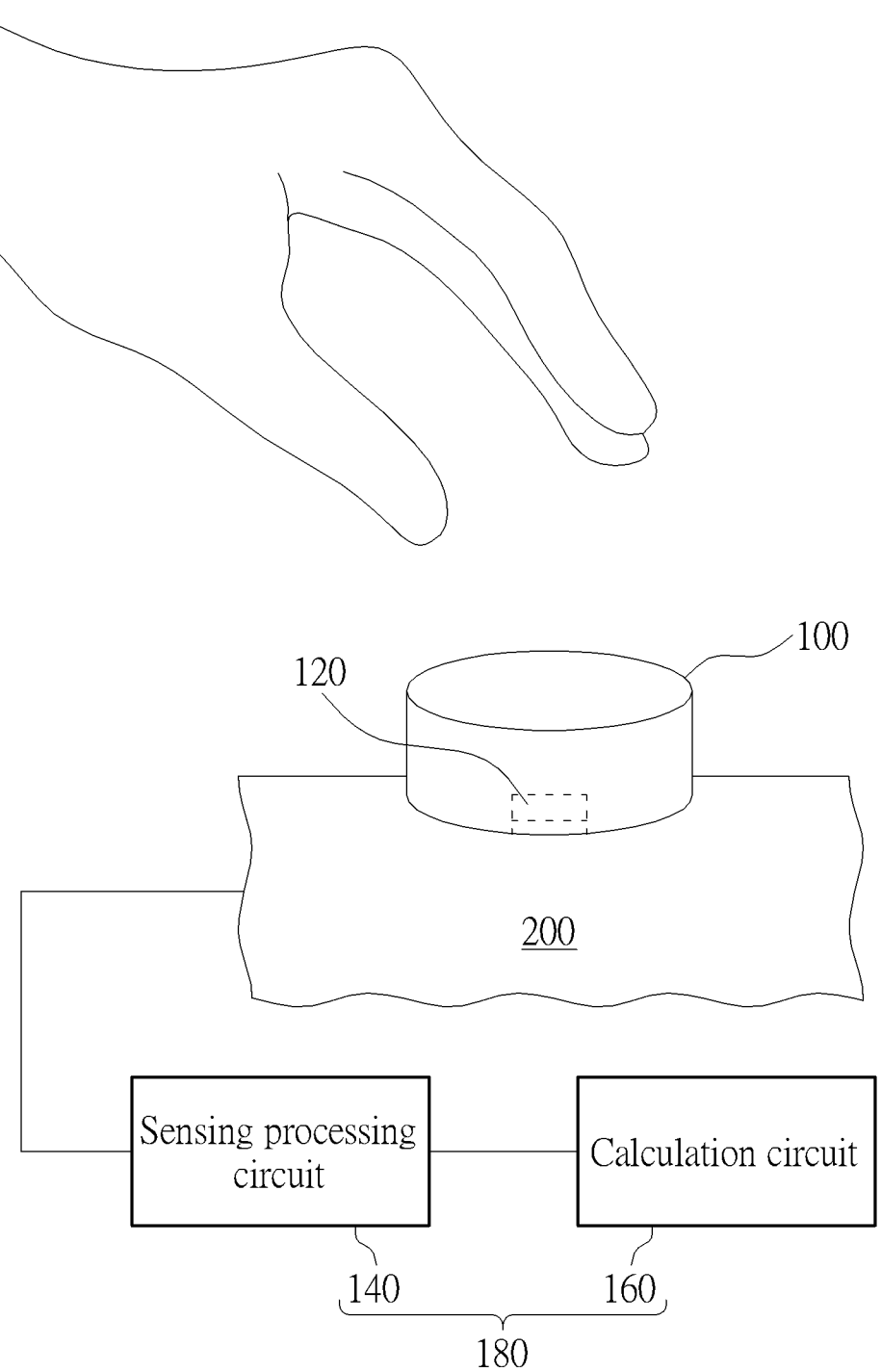
FIG. 1 is a diagram of a calibration apparatus for a knob applicable to a touch panel according to an embodiment of the present invention.

Please refer to FIG. 1. FIG. 1 is a diagram of a calibration apparatus 180 for a knob 100 applicable to a touch panel 200 according to an embodiment of the present invention. As shown in FIG. 1, the knob 100 is arranged on the touch panel 200, and comprises at least one sensing pad 120. In one embodiment, the knob 100 may comprise only a single sensing pad 120. In another embodiment, the knob 100 may comprise multiple sensing pads 120. For brevity, only one sensing pad 120 is shown in FIG. 1. Taking the knob 100 with only a single sensing pad 120 as an example, when a user operates the knob 100 by contacting the knob 100, the knob 100 forms a conductive path through the sensing pad 120. This path allows the user's finger touching the knob 100 to be connected to the touch panel 200 through the conductive path, which is equivalent to allowing the user to indirectly control the touch panel 200. In other words, when the user touches the knob 100, the touch panel 200 generates a sensing signal in response to a loop formed by the touch panel 200, the knob 100 and the user. The sensing signal comprises position information of the sensing pad 120. Furthermore, when the user rotates the knob 100, the touch panel 200 generates multiple sensing signals in response to the movement and positions of the sensing pad 120, such that a rotation angle may be calculated through the positions of the sensing pad 120. In addition, the calibration apparatus 180 for the knob 100 is provided for performing calibration on the position of the knob. The calibration apparatus 180 comprises a sensing processing circuit 140 and a calculation circuit 160. The sensing processing circuit 140 is configured to obtain at least one sensed position of each sensing pad 120 by sensing a position of each sensing pad 120 through the touch panel 200. The calculation circuit 160 is configured to calculate a position of a center of the knob 100 by using a formula of a radius of a circumscribed circle according the at least one sensed position of each sensing pad 120, such that a new position of the center of the knob 100 may be obtained to replace an original position of the center of the knob 100.

Figure 2:
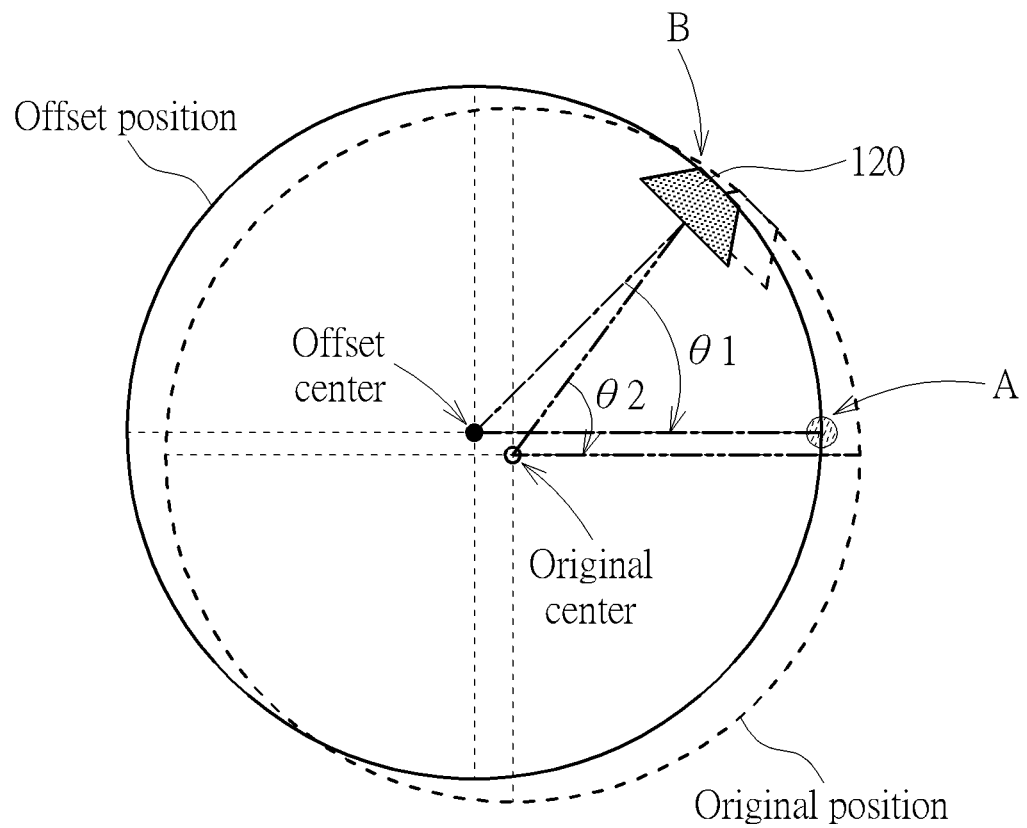
FIG. 2 is a diagram illustrating a position offset of a knob and affected rotation angles.

A position of the knob may be offset for some reasons, such that the rotation angle may be erroneously determined for an offset center of the knob. Please refer to FIG. 2. FIG. 2 is a diagram illustrating a position offset of the knob 100 and affected rotation angles. As shown in FIG. 2, for example, the knob 100 is offset from an original position to an offset position, such that a center of the knob 100 is also offset. Assuming that the sensing pad 120 is rotated from a position A to a position B (in the offset position), the position B of the sensing pad 120 is the sensed position, such that the sensing pad 120 is determined being rotated by a rotation angle θ1 relative to the offset center. However, assuming that the center of the knob 100 is offset and not calibrated, the position of the center is regarded as the position of the original center. As a result, since the sensed position of the sensing pad 120 is the position B, a rotation angle of the sensing pad 120 relative to the original center is calculated to be θ2, such that the rotation angle of the knob is erroneously determined as the rotation angle θ2. Therefore, the position of the center of the knob has to be corrected.

Figure 3:
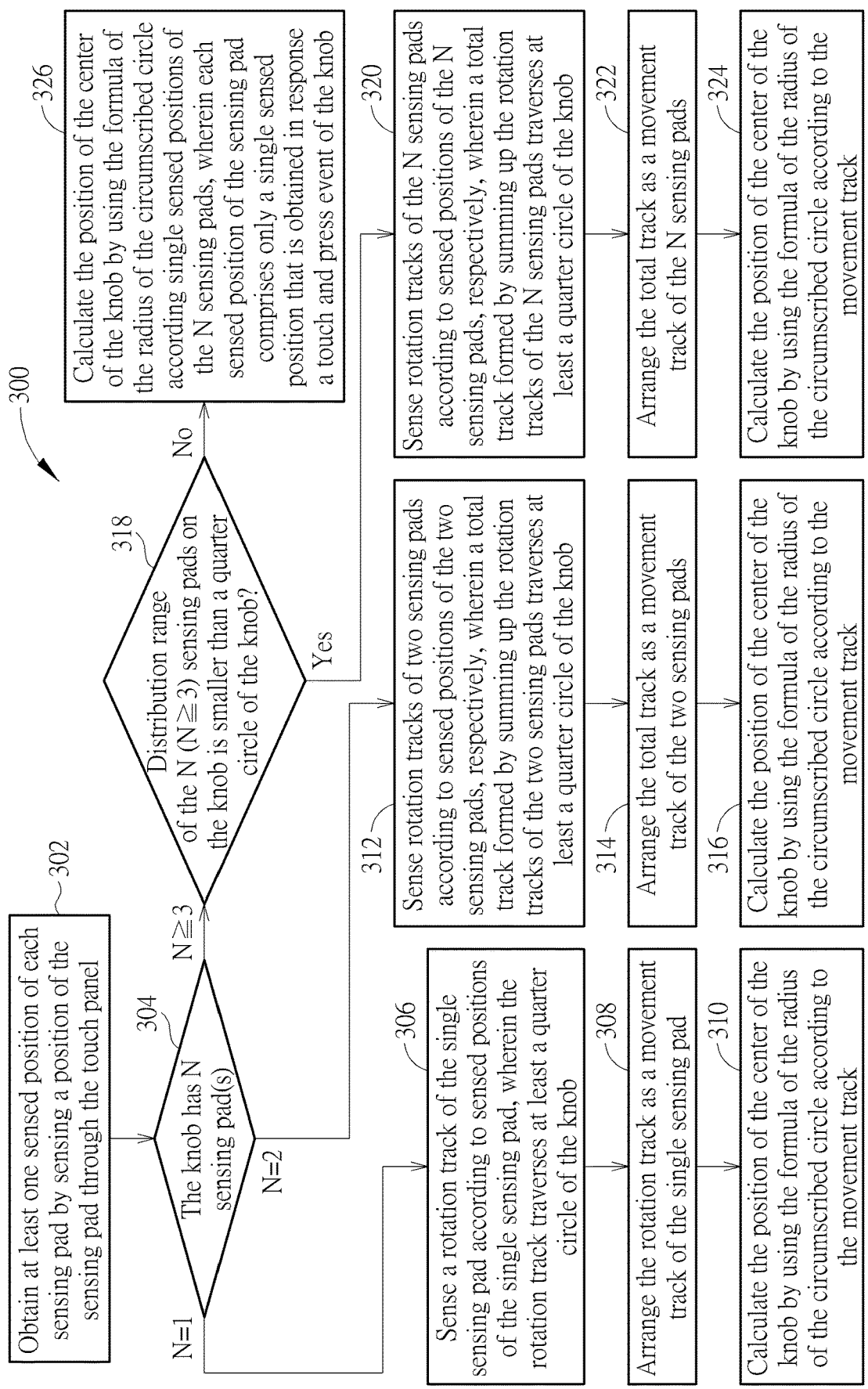
FIG. 3 is a flowchart of a calibration method for the knob according to an embodiment of the present invention.

Please refer to FIG. 3. FIG. 3 is a flowchart 300 of a calibration method for the knob 100 according to an embodiment of the present invention. The calibration method 300 of the present invention may be employed by the calibration apparatus 180 shown in FIG. 1, and may comprise following steps.

Step 302: Obtain at least one sensed position of each sensing pad by sensing a position of the sensing pad through the touch panel;

Step 304: Determine the quantity of sensing pads employed by the knob 100. The knob 100 has N sensing pads and N is a positive integer. If the knob 100 has only a single sensing pad (labeled "N=1" in FIG. 3 for brevity), the flow proceeds with Step 306; If the knob 100 has only two sensing pads (labeled "N=2" in FIG. 3 for brevity), the flow proceeds with Step 312; If the knob 100 has three or more sensing pads (labeled "N≥3" in FIG. 3 for brevity), the flow proceeds with Step 320;

Step 306: Sense a rotation track of the single sensing pad according to sensed positions of the single sensing pad, wherein the rotation track traverses at least a quarter circle of the knob;

Step 308: Arrange the rotation track as a movement track of the single sensing pad; and Step 310: Calculate the position of the center of the knob by using the formula of the radius of the circumscribed circle according to the movement track.

Step 312: Sense rotation tracks of two sensing pads according to sensed positions of the two sensing pads, respectively, wherein a total track formed by summing up the rotation tracks of the two sensing pads traverses at least a quarter circle of the knob;

Step 314: Arrange the total track as a movement track of the two sensing pads; and Step 316: Calculate the position of the center of the knob by using the formula of the radius of the circumscribed circle according to the movement track.

Step 318: Determine whether a distribution range of the N (N≥3) sensing pads on the knob is smaller than a quarter circle of the knob. If Yes, the flow proceeds with Step 320; If No, the flow proceeds with Step 326.

Step 320: Sense rotation tracks of the N sensing pads according to sensed positions of the N sensing pads, respectively, wherein a total track formed by summing up the rotation tracks of the N sensing pads traverses at least a quarter circle of the knob;

Step 322: Arrange the total track as a movement track of the N sensing pads; and Step 324: Calculate the position of the center of the knob by using the formula of the radius of the circumscribed circle according to the movement track.

Step 326: Calculate the position of the center of the knob by using the formula of the radius of the circumscribed circle according single sensed positions of the N sensing pads, wherein each sensed position of the sensing pad comprises only a single sensed position that is obtained in response a touch and press event of the knob.

The calibration method uses a formula of a radius of a circumscribed circle to calculate a new position of the center of the knob according to the multiple sensed positions of the sensing pad(s). A distribution range of the multiple sensed positions has to be not smaller (e.g., greater and equal) than a quarter circle of the knob for accuracy of calculation. Therefore, in response to the knobs having different numbers of sensing pads, the knobs are required to be rotated at different angles or be pressed.

Figure 4:
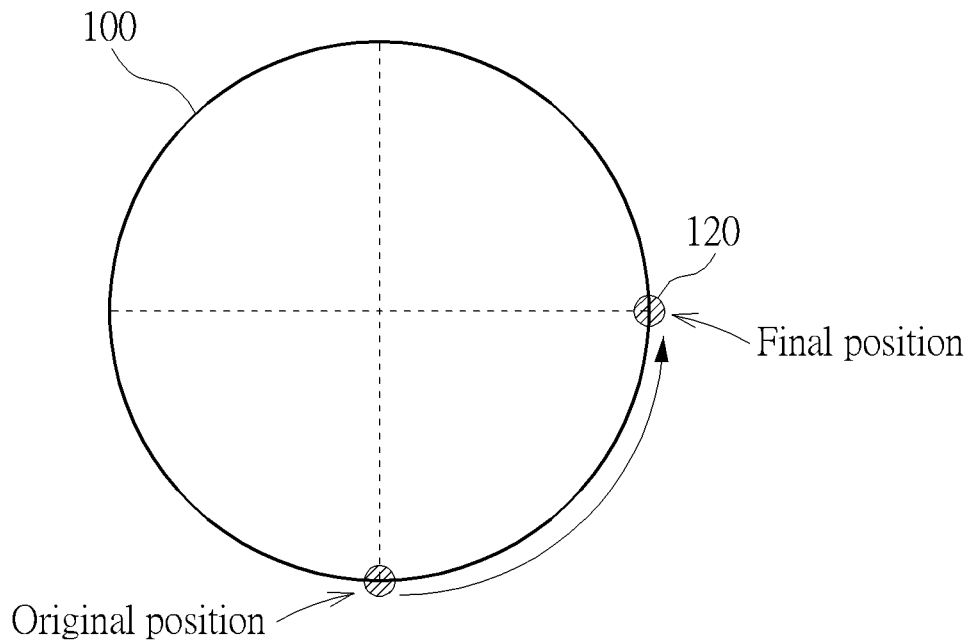
FIG. 4 is a diagram illustrating the calibration method for the knob with only a single sensing pad according to an embodiment of the present invention.

Please refer to FIG. 4. FIG. 4 is a diagram illustrating the calibration method for the knob 100 with only a single sensing pad 120 according to an embodiment of the present invention. For obtaining the sensed positions distributed along a partial perimeter not smaller than a quarter circle of the knob 100, the knob 100 with only a single sensing pad 120 needs to be rotated at least a quarter circle of the knob. In other words, the knob 100 with only a single sensing pad 120 needs to be rotated by at least 90 degrees. The sensed positions are generated in response a touch and rotation event of the knob 100. An original position and a final position of the sensing pad 120 are distributed along a partial perimeter not smaller than a quarter circle of the knob, such that the original position, the final position and any position on the movement track of the single sensing pad 120 can be used to calculate the position of the center of the knob 100.

Figure 5:
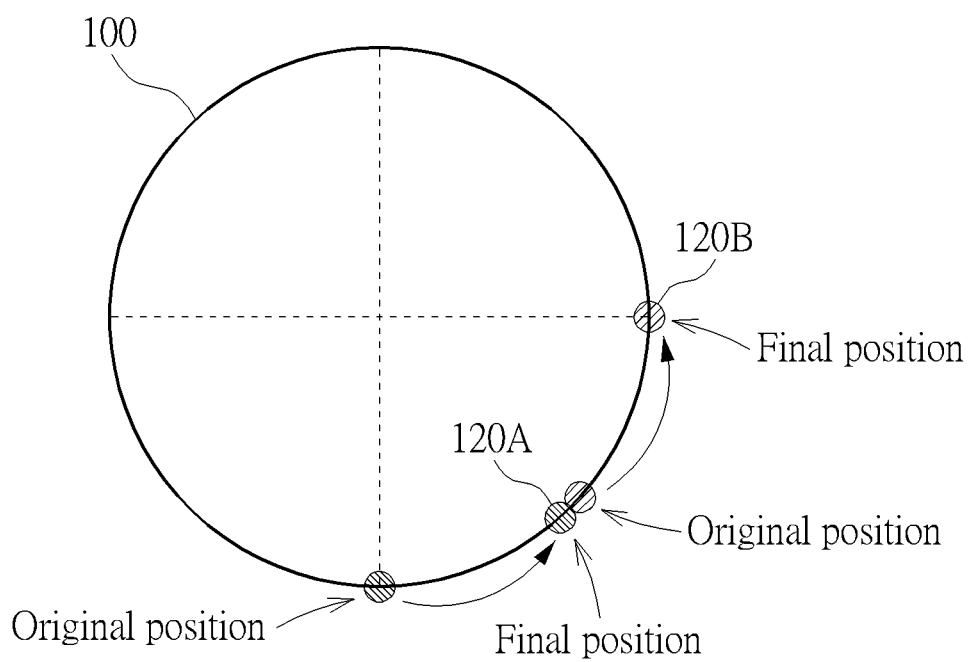
FIG. 5 is a diagram illustrating the calibration method for the knob with two single sensing pads according to an embodiment of the present invention.

Please refer to FIG. 5. FIG. 5 is a diagram illustrating the calibration method for the knob 100 with two sensing pads 120 according to an embodiment of the present invention. Similarly, for obtaining the sensed positions distributed along a partial perimeter not smaller than a quarter circle of the knob 100, the knob 100 having two sensing pad 120A and 120B needs to be rotated. The sensed positions are generated in response a touch and rotation event of the knob 100. The two sensing pads 120A and 120B have two rotation tracks respectively. A total track is formed by summing up the rotation tracks of the two sensing pads 120A and 120B, and the total track has to traverse at least a quarter circle of the knob. As shown in FIG. 5, an original position of the sensing pad 120A and a final position of the sensing pad 120B are distributed along a partial perimeter not smaller than a quarter circle of the knob, such that the original position of the sensing pad 120A, the final position of the sensing pad 120B and any position on the rotation track of any sensing pad can be used to calculate the position of the center of the knob 100. It should be noticed that an overlapped part of the two rotation tracks is considered as one rotation track in the total track.

Figure 6:
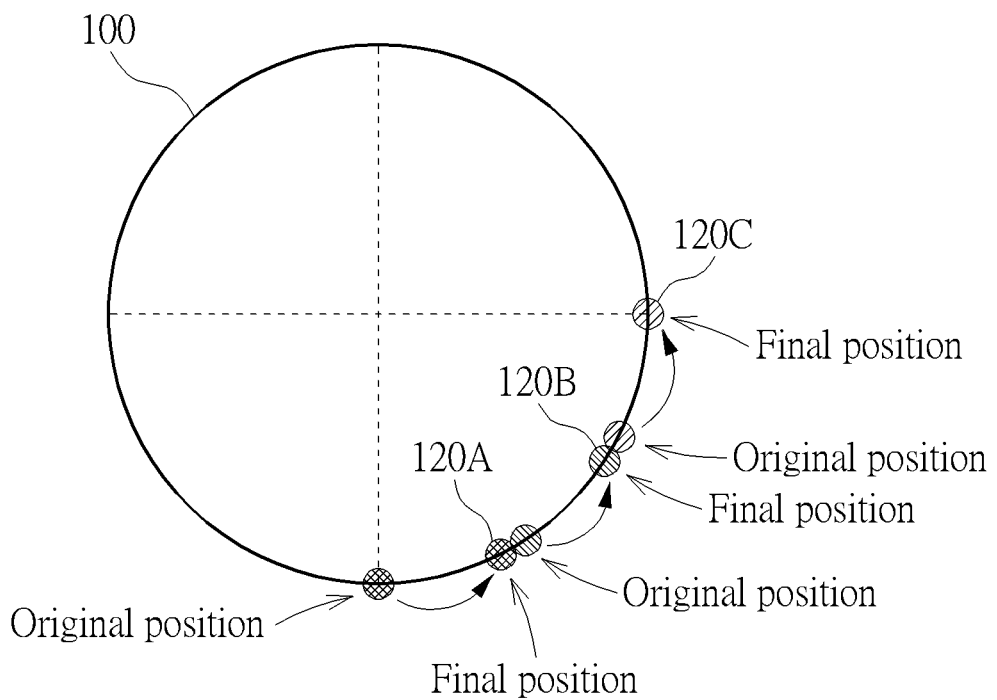
FIG. 6 is a diagram illustrating the calibration method for the knob with three single sensing pads with distribution range being smaller than a quarter circle of the knob according to an embodiment of the present invention.

Please refer to FIG. 6. FIG. 6 is a diagram illustrating the calibration method for the knob 100 having three single sensing pads 120 with a distribution range being smaller than a quarter circle of the knob according to an embodiment of the present invention. Similarly, for obtaining the sensed positions distributed along a partial perimeter not smaller than a quarter circle of the knob 100, the knob 100 having three sensing pad 120A, 120B and 120C needs to be rotated. The sensed positions are generated in response a touch and rotation event of the knob 100. The three sensing pads 120A, 120B and 120C have three rotation tracks, respectively. A total track is formed by summing up the rotation tracks of the three sensing pads 120A, 120B and 120C, and the total track has to traverse at least a quarter circle of the knob. As shown in FIG. 6, an original position of the sensing pad 120A and a final position of the sensing pad 120C are distributed along a partial perimeter not smaller than a quarter circle of the knob, such that the original position of the sensing pad 120A, the final position of the sensing pad 120C and any position on the rotation track of any sensing pad can be used to calculate the position of the center of the knob 100. It should be noticed that an overlapped part of the three rotation tracks is considered as one rotation track in the total track. Furthermore, if a knob has more than three sensing pads with distribution range being smaller than a quarter circle of the knob, the total track also has to traverse at least a quarter circle of the knob, in order to obtain the necessary sensed positions.

Figure 7:
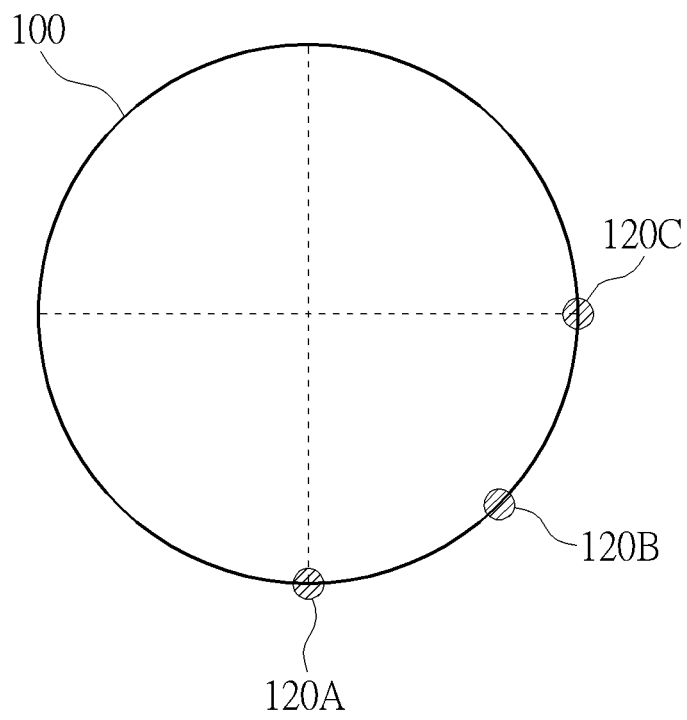
FIG. 7 is a diagram illustrating the calibration method for the knob with three single sensing pads with distribution range being not smaller than a quarter circle of the knob according to an embodiment of the present invention.

Please refer to FIG. 7. FIG. 7 is a diagram illustrating the calibration method for the knob 100 with three single sensing pads 120 with a distribution range being not smaller than a quarter circle of the knob according to an embodiment of the present invention. For obtaining the sensed positions distributed along a partial perimeter not smaller than a quarter circle of the knob, the knob 100 having three sensing pad 120A, 120B and 120C may be directly pressed without being rotated. As shown in FIG. 7, since the three sensing pad 120A, 120B and 120C are distributed along a partial perimeter not smaller than a quarter circle of the knob, the positions of the three sensing pad 120A, 120B and 120C can be used to calculate the position of the center of the knob 100. The sensed positions are generated in response a touch and press event of the knob 100. It should be noticed that a press event of the knob 100 is to obtain the positions of the three sensing pad 120A, 120B and 120C. In some embodiments, a slightly touch can let the touch panel sense the positions of the three sensing pads of the knob. Furthermore, if a knob has more than three sensing pads with a distribution range being not smaller than a quarter circle of the knob, the position of the center of the knob can be calculated according to the original positions of the sensing pads.

Specifically, there are actually some differences in the positions of the center of the knob calculated according to different sensed positions in the rotation track. Therefore, at least one another position of the center of the knob can be calculated according another sensed positions of each sensing pad, and an average position of the center of the knob can be obtain by performing average calculation on multiple calculated positions of the center of the knob to make the calibrated position of the center more accurate, where the multiple calculated positions comprise the position and the another position of the center of the knob.

According to the above arrangement, the present invention calibration method and calibration apparatus are able to obtain the new position of the center of the knobby calculating. Through pressing or rotating the knob, the positions of one or more sensing pads can be obtained. The new position of the center of the knob can be calculated according enough sensed positions of one or more sensing pads. The calibration method of the present invention provides an accurate position of the center of the knob, thereby preventing the rotation angle of the knob from being determined erroneously and improving the stability and reliability of the knob.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A calibration method for a knob applicable to a touch panel, the knob comprising at least one sensing pad, the calibration method comprising:
   obtaining at least one sensed position of each sensing pad of the at least one sensing pad by sensing a position of the each sensing pad through the touch panel;
   calculating a position of a center of the knob by using a formula of a radius of a circumscribed circle according the at least one sensed position of the each sensing pad;
   obtaining at least one another sensed position of the each sensing pad by sensing the position of the each sensing pad through the touch panel, wherein the at least one another sensed position of the each sensing pad is not identical to the at least one sensed position of the each sensing pad;
   calculating another position of the center of the knob by using the formula of the radius of the circumscribed circle according the at least one another sensed position of the each sensing pad;
   obtaining an average position of the center of the knob by performing average calculation on a plurality of calculated positions of the center of the knob, wherein the plurality of calculated positions comprise the position of the center of the knob and the another position of the center of the knob; and
   determining a rotation angle of the knob according to the average position of the center of the knob.

2. The calibration method of claim 1, wherein the at least one sensed position of the each sensing pad comprises multiple sensed positions that are obtained in response a touch and rotation event of the knob.

3. The calibration method of claim 2, wherein the knob comprises only a single sensing pad, and calculating the position of the center of the knob by using the formula of the radius of the circumscribed circle according the at least one sensed position of the each sensing pad comprises:
   sensing a rotation track of the single sensing pad according to sensed positions of the single sensing pad, wherein the rotation track traverses at least a quarter circle of the knob;
   arranging the rotation track as a movement track of the single sensing pad; and
   calculating the position of the center of the knob by using the formula of the radius of the circumscribed circle according to the movement track.

4. The calibration method of claim 2, wherein the knob comprises only two sensing pads, and calculating the position of the center of the knob by using the formula of the radius of the circumscribed circle according the at least one sensed position of the each sensing pad comprises:

sensing rotation tracks of the two sensing pads according to sensed positions of the two sensing pads, respectively, wherein a total track formed by summing up the rotation tracks of the two sensing pads traverses at least a quarter circle of the knob;

arranging the total track as a movement track of the two sensing pads; and calculating the position of the center of the knob by using the formula of the radius of the circumscribed circle according to the movement track.

5. The calibration method of claim 4, wherein an overlapped part of the two rotation tracks is considered as one rotation track.

6. The calibration method of claim 2, wherein the knob comprises N sensing pads, N is a positive integer not smaller than 3, a distribution range of the N sensing pads on the knob is smaller than a quarter circle of the knob, and calculating the position of the center of the knob by using the formula of the radius of the circumscribed circle according the at least one sensed position of the each sensing pad comprises:

sensing rotation tracks of the N sensing pads according to sensed positions of the N sensing pads, respectively, wherein a total track formed by summing up the rotation tracks of the N sensing pads traverses at least a quarter circle of the knob;

arranging the total track as a movement track of the N sensing pads; and calculating the position of the center of the knob by using the formula of the radius of the circumscribed circle according to the movement track.

7. The calibration method of claim 6, wherein an overlapped part resulting from at least two of the N rotation tracks is considered as one rotation track.

8. The calibration method of claim 1, wherein the at least one sensed position of the each sensing pad comprises only a single sensed position that is obtained in response a touch and press event of the knob.

9. The calibration method of claim 8, wherein the knob comprises N sensing pads, N is a positive integer not smaller than 3, a distribution range of the N sensing pads on the knob is not smaller than a quarter circle of the knob, and calculating the position of the center of the knob by using the formula of the radius of the circumscribed circle according the at least one sensed position of the each sensing pad comprises:

calculating the position of the center of the knob by using the formula of the calculating the position of the center of the knob by using the formula of the radius of the circumscribed circle according single sensed positions of the N sensing pads.

10. A calibration apparatus for a knob applicable to a touch panel, the knob comprising at least one sensing pad, the calibration apparatus comprising:

a sensing processing circuit, configured to:
   obtain at least one sensed position of each sensing pad of the at least one sensing pad by sensing a position of the each sensing pad through the touch panel; and
   obtain at least one another sensed position of the each sensing pad by sensing the position of the each sensing pad through the touch panel; and the at least one another sensed position of the each sensing pad is not identical to the at least one sensed position of the each sensing pad; and a calculation circuit, configured to:
   calculate a position of a center of the knob by using a formula of a radius of a circumscribed circle according the at least one sensed position of the each sensing pad;
   calculate another position of the center of the knob by using the formula of the radius of the circumscribed circle according the at least one another sensed position of the each sensing pad;
   obtain an average position of the center of the knob by performing average calculation on a plurality of calculated positions of the center of the knob; and
   determine a rotation angle of the knob according to the average position of the center of the knob.

\* \* \* \* \*